(No Model.)

R. MANNING.
Bridle Winker.

No. 237,116.        Patented Feb. 1, 1881.

Witnesses:
Charles L. Pell
Wm Bowers

Inventor
Robert Manning
by
O. Drake,
Atty

N. PETERS, PHOTO-LITHOGRAPHER, WASHINGTON, D. C.

UNITED STATES PATENT OFFICE.

ROBERT MANNING, OF NEWARK, NEW JERSEY.

BRIDLE-WINKER.

SPECIFICATION forming part of Letters Patent No. 237,116, dated February 1, 1881.

Application filed November 30, 1880. (No model.)

*To all whom it may concern:*

Be it known that I, ROBERT MANNING, of Newark, in the county of Essex and State of New Jersey, have invented certain new and useful Improvements in Ornamenting Bridle Winkers or Blinds; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to inexpensively ornament harness, more particularly bridle-winkers; and it consists in inlaying a portion of leather of any desired shape or color into the outer facing of the same and fastening it therein, in the manner set forth and shown hereinafter.

It consists, further, in the combination, in a bridle-winker with the exterior facing partially removed, as hereinafter shown and described, of a portion of leather of contrasting color corresponding in shape with said removed portion and fitting into the said facing, and a third intervening piece laid behind the before-mentioned parts and secured thereto so as to combine the said parts more perfectly.

Figure 1:
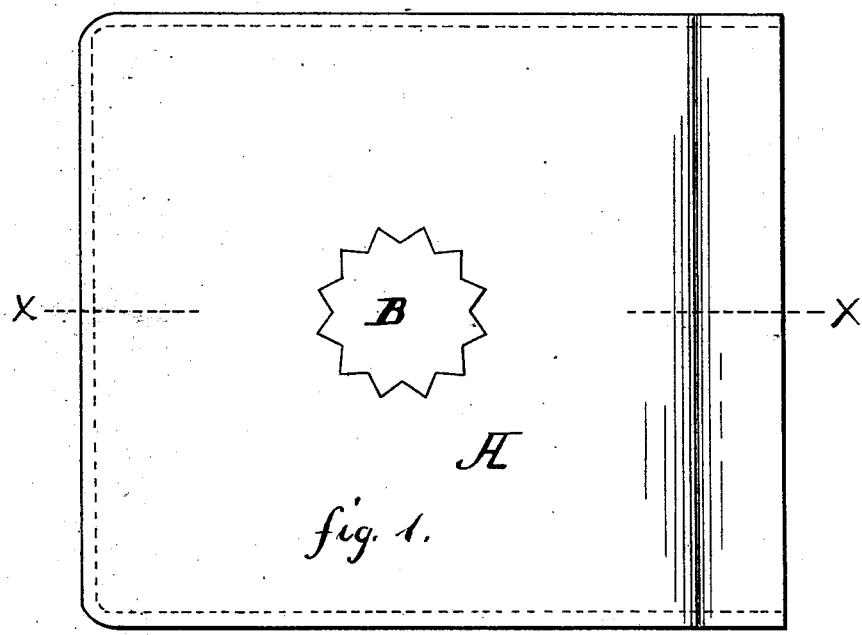
Figure 2:
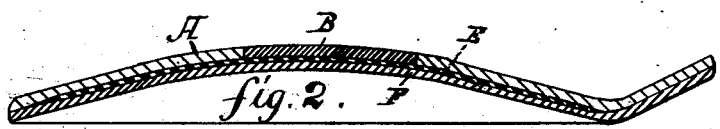
Figure 3:
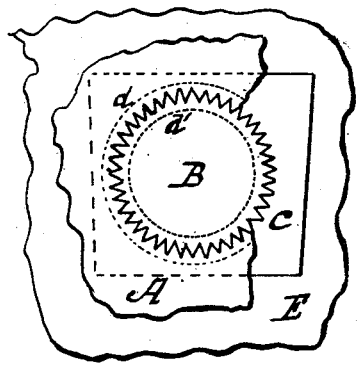

Referring to the accompanying drawings, in which similar letters of reference indicate like parts in each of the several figures, Figure 1 represents a plan view of a bridle-winker; Fig. 2, a section of the same, taken through line $x$, Fig. 1; and Fig. 3 is a plan view, showing a portion of a winker, illustrating a modification in the manner of uniting the parts.

In carrying out my invention the face of the winker A is cut away in some geometric form or after any appropriate design, and into the space produced thereby is placed a portion, B, of leather, celluloid, metal, or other appropriate material of some contrasting color, and conforming thereto in shape. Beneath said facing A and inlaid portion B may be placed a thin piece, $c$, intervening between said parts A B and the metallic winker-plate E, Fig. 2. Said intervening piece $c$ may be sewed to both the parts A B, conjoining them, as shown in Fig. 3, wherein the lines of sewing are marked $d$ $d'$; or said piece $c$ may be glued or cemented to the parts A B; or, further, the part $c$ may be removed and the facing A and inlaid portion B may be cemented directly to the metallic winker-plate.

The manner of constructing the winker having my invention thereon is substantially as follows, when the inlaid portion is held in position by glue or cement:

The parts A B $c$ E F are placed in their relative positions, as shown in the drawings, and cement is placed beneath the portion B. The parts are then pressed by the usual mechanical means into the proper concavo-convex shape, the metallic plate E causing all the parts to retain the impressed form. The said operation of pressing into shape forces the cement into the joints between the parts A B, filling the same, and thus securely uniting the parts into one.

This method of ornamenting may evidently be applied to draft or tug ends, drops, rosettes, and other harness leather-work.

By this invention the ornament, which heretofore has projected above the face of the winker, and has thus been easily defaced by contact, is brought flush with the face of the winker, forming one smooth surface, and thus doing away with the objectionable features of the previous methods.

I do not claim, broadly, the application of the principle of ornamentation by inlaying; but I am not aware that the method has ever before been applied to the leather portions of harness, as herein set forth. I limit myself accordingly.

Having thus described my invention, what I claim, and wish to secure by Letters Patent, is—

The combination, in a bridle-winker having the exterior facing, A, partially cut away, substantially as herein shown and described, of said facing A, with an inlaying portion, B, of contrasting color, and an intervening piece, $c$, all arranged and combined substantially as herein shown and described.

In testimony that I claim the foregoing I have hereunto set my hand this 4th day of November, 1880.

ROBERT MANNING.

Witnesses:
OLIVER DRAKE,
CHARLES H. PELL.